(12) United States Patent
Kinomura et al.

(10) Patent No.: US 9,751,421 B2
(45) Date of Patent: Sep. 5, 2017

(54) CHARGING SYSTEM FOR VEHICLE, METHOD FOR CHARGING VEHICLE, POWER SUPPLY SYSTEM, AND POWER SUPPLY METHOD

(75) Inventors: Shigeki Kinomura, Toyota (JP); Shinji Ichikawa, Toyota (JP); Daisuke Ishii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 14/342,616

(22) PCT Filed: Sep. 8, 2011

(86) PCT No.: PCT/JP2011/070454
§ 371 (c)(1),
(2), (4) Date: Mar. 4, 2014

(87) PCT Pub. No.: WO2013/035178
PCT Pub. Date: Mar. 14, 2013

(65) Prior Publication Data
US 2014/0217956 A1     Aug. 7, 2014

(51) Int. Cl.
| | | |
|---|---|---|
| *H02J 7/00* | (2006.01) | |
| *B60L 11/18* | (2006.01) | |
| *H02J 7/04* | (2006.01) | |
| *H02J 7/35* | (2006.01) | |

(52) U.S. Cl.
CPC ......... *B60L 11/185* (2013.01); *B60L 11/1861* (2013.01); *H02J 7/0027* (2013.01); *H02J 7/0055* (2013.01); *H02J 7/044* (2013.01); *H02J 7/045* (2013.01); *H02J 7/35* (2013.01); *Y02T 10/7055* (2013.01)

(58) Field of Classification Search
CPC ........................................................ Y02T 90/14
USPC ........................................................ 320/109
See application file for complete search history.

(56) References Cited

U.S. PATENT DOCUMENTS

| | | | |
|---|---|---|---|
| 6,281,663 B1 * | 8/2001 | Yagi ..................... | B60L 11/1816 320/150 |
| 2008/0007202 A1 | 1/2008 | Pryor | |
| 2008/0067974 A1 | 3/2008 | Zhang et al. | |
| 2009/0079389 A1 | 3/2009 | Ohtomo | |
| 2009/0140698 A1 * | 6/2009 | Eberhard ................ | H02J 7/045 320/152 |
| 2009/0326749 A1 * | 12/2009 | Uchida .............. | G01R 31/3679 701/22 |
| 2010/0164439 A1 * | 7/2010 | Ido ........................ | B60L 11/182 320/155 |

(Continued)

FOREIGN PATENT DOCUMENTS

| | | |
|---|---|---|
| CN | 1945923 A | 4/2007 |
| CN | 101098030 A | 1/2008 |

(Continued)

*Primary Examiner* — Suresh Memula
(74) *Attorney, Agent, or Firm* — Oliff PLC (57) ABSTRACT

A vehicle includes a first inlet to be connected to a commercial power source, a second inlet to be connected to a battery of an HEMS (Home Energy Management System) which supplies electric power greater than electric power supplied by the commercial power source, and an ECU. The ECU indicates one of the first inlet and the second inlet to a user in accordance with a state of a battery of the vehicle.

7 Claims, 5 Drawing Sheets

(56) References Cited

U.S. PATENT DOCUMENTS

| | | | |
|---|---|---|---|
| 2011/0133694 A1 | 6/2011 | Song | |
| 2011/0199048 A1 | 8/2011 | Yokoyama et al. | |
| 2012/0249065 A1* | 10/2012 | Bissonette | B60L 11/184 320/109 |
| 2013/0009599 A1* | 1/2013 | Yukizane | B60L 11/1816 320/109 |
| 2013/0020983 A1 | 1/2013 | Ishikawa et al. | |
| 2013/0035812 A1* | 2/2013 | Bernard | H01M 10/44 701/22 |
| 2014/0375272 A1* | 12/2014 | Johnsen | B60L 11/16 320/136 |

FOREIGN PATENT DOCUMENTS

| | | |
|---|---|---|
| CN | 101150259 A | 3/2008 |
| CN | 101728862 A | 6/2010 |
| CN | 201528214 U | 7/2010 |
| CN | 101908771 A | 12/2010 |
| CN | 102088197 A | 6/2011 |
| JP | A-H07-274308 | 10/1995 |
| JP | A-2008-083022 | 4/2008 |
| JP | A-2009-071986 | 4/2009 |
| JP | A-2009-077557 | 4/2009 |
| JP | A-2009-097270 | 5/2009 |
| JP | 2010-028913 A | 2/2010 |
| JP | 2010-093891 A | 4/2010 |
| JP | A-2010-076523 | 4/2010 |
| JP | A-2010-187467 | 8/2010 |
| JP | A-2011-147283 | 7/2011 |
| JP | 2011-172327 A | 9/2011 |
| WO | 2011/083873 A1 | 7/2011 |

* cited by examiner

CHARGING SYSTEM FOR VEHICLE, METHOD FOR CHARGING VEHICLE, POWER SUPPLY SYSTEM, AND POWER SUPPLY METHOD

TECHNICAL FIELD

The present invention relates to a charging system for a vehicle, a method for charging a vehicle, a power supply system, and a power supply method. In particular, the present invention relates to a technique of indicating, to a user, a device for charging a power storage device mounted in a vehicle.

BACKGROUND ART

Electric vehicles and hybrid vehicles which can travel using an electric motor as a drive source are known. A power storage device such as a battery mounted in an electric vehicle or a hybrid vehicle can be charged by electric power supplied from an external power source, utilizing a charging stand provided in a house or the like.

As an example, a battery is charged using one of a quick charger and a normal charger, as described in Japanese Patent Laying-Open No. 2009-77557 (PTD 1).

CITATION LIST

Patent Document

PTD 1: Japanese Patent Laying-Open No. 2009-77557

SUMMARY OF INVENTION

Technical Problem

However, since the remaining capacity of the battery mounted in a vehicle is invisible to a user, the user may hesitate to choose which charger to use, from the quick charger and the normal charger.

One object of the present invention is to improve convenience of users.

Solution to Problem

In an embodiment, a charging system for a vehicle equipped with a power storage device includes a charging device charging the power storage device in one of a first charging mode and a second charging mode in which electric power greater than electric power supplied in the first charging mode is supplied, and an indicating device indicating one of the first charging mode and the second charging mode to a user in accordance with a state of the power storage device.

With this configuration, since one of the first charging mode and the second charging mode is indicated to the user in accordance with the state of the power storage device of the vehicle, the user can easily determine a charging mode to be used for charging. Therefore, convenience of the user when the user charges the power storage device is improved.

In another embodiment, in the first charging mode, the power storage device is charged by electric power supplied from a first power source. In the second charging mode, the power storage device is charged by electric power supplied from a second power source different from the first power source.

With this configuration, a power source suitable to be used for charging can be chosen from at least two power sources.

In still another embodiment, the charging system further includes a first connection portion to be connected to the first power source, and a second connection portion to be connected to the second power source. The indicating device indicates one of the first connection portion and the second connection portion to the user in accordance with the state of the power storage device.

With this configuration, since one of the first connection portion and the second connection portion is indicated to the user in accordance with the state of the power storage device of the vehicle, the user can easily determine a connection portion to be used for charging.

In still another embodiment, the first power source is a commercial power source. The second power source is a power storage device arranged outside the vehicle.

With this configuration, a power source suitable to be used for charging can be chosen from the commercial power source and the power storage device.

In still another embodiment, when the power storage device has a remaining capacity smaller than a predetermined value, the indicating device indicates the second charging mode to the user.

With this configuration, when the power storage device of the vehicle has a small remaining capacity, the power storage device can be quickly charged by utilizing the second charging mode having high charging power.

In still another embodiment, when the power storage device has a remaining capacity greater than a predetermined value, the indicating device indicates the first charging mode to the user.

With this configuration, when the power storage device of the vehicle has a large remaining capacity, the power storage device can be slowly charged to be close to a fully charged state by utilizing the first charging mode having low charging power.

In still another embodiment, when the power storage device has a temperature higher than a predetermined value, the indicating device indicates the first charging mode to the user.

With this configuration, when the power storage device of the vehicle has a high temperature, the power storage device can be slowly charged by utilizing the first charging mode having low charging power. Therefore, an excessive increase in the temperature of the power storage device can be suppressed.

In still another embodiment, when the power storage device has a degradation degree greater than a predetermined value, the indicating device indicates the first charging mode to the user.

With this configuration, when the power storage device of the vehicle has a high degradation degree, the power storage device can be slowly charged by utilizing the first charging mode having low charging power. Therefore, progress of degradation of the power storage device can be slowed down.

In still another embodiment, the vehicle is provided with an outlet for drawing electric power from the power storage device. When a power cord of an electronic apparatus is connected to the outlet provided to the vehicle, the indicating device indicates the first charging mode to the user.

With this configuration, when a power cord of an electronic apparatus is connected to the outlet for drawing electric power from the power storage device of the vehicle, the power storage device can be slowly charged by utilizing the first charging mode having low charging power. Therefore, a sudden change in voltage or the like supplied to the electronic apparatus can be prevented.

In still another embodiment, a method for charging a vehicle equipped with a power storage device includes the steps of determining a state of the power storage device, and indicating one of a first charging mode and a second charging mode in which electric power greater than electric power supplied in the first charging mode is supplied, to a user.

With this configuration, since one of the first charging mode and the second charging mode is indicated to the user, the user can easily determine a charging mode to be used for charging. Therefore, convenience of the user when the user charges the power storage device is improved.

In still another embodiment, a power supply system includes a first supply device supplying electric power to a vehicle in a first charging mode, a second supply device supplying electric power to the vehicle in a second charging mode in which the electric power greater than the electric power supplied in the first charging mode is supplied, and an indicating device indicating one of the first charging mode and the second charging mode to a user.

With this configuration, since one of the first charging mode and the second charging mode is indicated to the user, the user can easily determine a charging mode to be used for charging. Therefore, convenience of the user is improved.

In still another embodiment, in the first charging mode, the electric power is supplied from a first power source. In the second charging mode, the electric power is supplied from a second power source different from the first power source.

With this configuration, a power source suitable to be used for charging can be chosen from at least two power sources.

In still another embodiment, the first power source is a commercial power source. The second power source is a power storage device.

With this configuration, a power source suitable to be used for charging can be chosen from the commercial power source and the power storage device.

In still another embodiment, the indicating device indicates one of the first charging mode and the second charging mode to the user in accordance with a state of the power storage device.

With this configuration, a charging mode suitable to be used for charging is indicated in accordance with the state of the power storage device.

In still another embodiment, when the power storage device has a remaining capacity greater than a predetermined value, the indicating device indicates the second charging mode to the user.

With this configuration, when the power storage device for the power supply system has a large remaining capacity, the power storage device of the vehicle can be quickly charged by utilizing the second charging mode having high charging power.

In still another embodiment, when the power storage device has a remaining capacity smaller than a predetermined value, the indicating device indicates the first charging mode to the user.

With this configuration, when the power storage device for the power supply system has a small remaining capacity, the power storage device of the vehicle can be charged by utilizing the commercial power source.

In still another embodiment, the indicating device indicates one of the first supply device and the second supply device to the user.

With this configuration, since one of the first supply device and the second supply device is indicated to the user in accordance with the state of the power storage device, the user can easily determine a supply device to be used for charging.

In still another embodiment, a power supply method includes the step of indicating one of a first charging mode and a second charging mode in which electric power greater than electric power supplied in the first charging mode is supplied, to a user.

With this configuration, since one of the first charging mode and the second charging mode is indicated to the user in accordance with the state of a power storage device, the user can easily determine a charging mode to be used for charging.

Advantageous Effects of Invention

Since one of the first charging mode and the second charging mode is indicated to the user, the user can easily determine a charging mode to be used for charging. Therefore, convenience of the user when the user charges the power storage device of the vehicle is improved.

DESCRIPTION OF EMBODIMENTS

Hereinafter, an embodiment of the present invention will be described in detail with reference to the drawings. It is noted that, in the drawings, identical or corresponding parts will be designated by the same reference numerals, and the description thereof will not be repeated.

Figure 1:
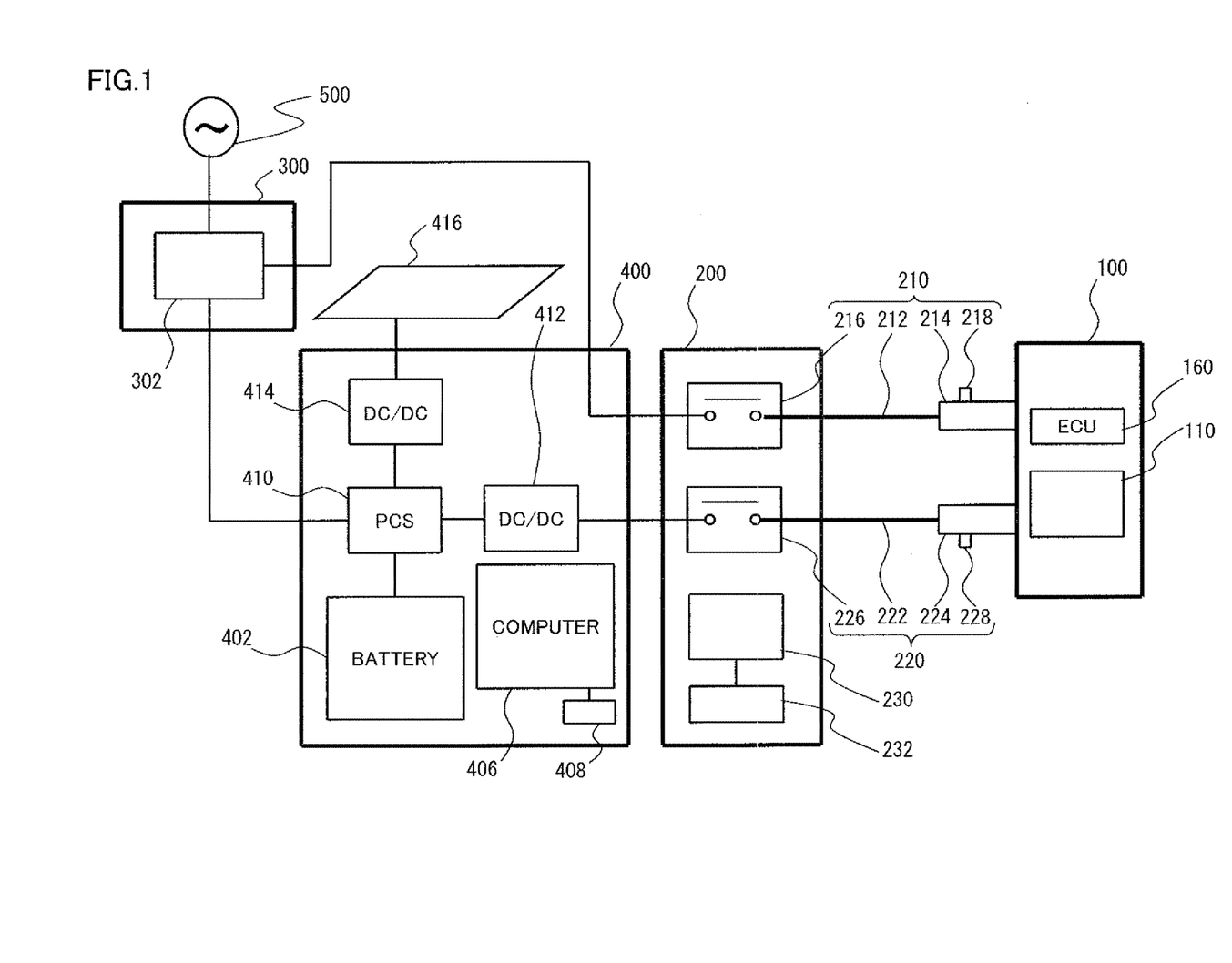
FIG. 1 is an overall schematic diagram showing equipment for charging a battery of a vehicle.

Referring to FIG. 1, equipment for charging a battery 110 of a vehicle 100 will be described. To vehicle 100, electric power is supplied from a battery 402 of an HEMS (Home Energy Management System) 400 installed inside or outside a building such as a house 300, or a commercial power source 500, via a charging stand 200.

In the present embodiment, battery 110 of vehicle 100 can be charged in one of a normal charging mode and a quick charging mode. In the normal charging mode, battery 110 of vehicle 100 is charged by an alternating current (AC) supplied from commercial power source 500 via house 300. In the quick charging mode, battery 110 of vehicle 100 is charged by a direct current (DC) supplied from battery 402. Electric power supplied to battery 110 of vehicle 100 in the quick charging mode is greater than electric power supplied to battery 110 of vehicle 100 in the normal charging mode. That is, electric power supplied from battery 402 of HEMS 400 to vehicle 100 is greater than electric power supplied from commercial power source 500 to vehicle 100.

Electric power may be supplied from battery 402 in the normal charging mode, and electric power greater than the electric power supplied from battery 402 may be supplied from commercial power source 500 in the quick charging mode.

Electric power may be supplied from battery 402 in the quick charging mode, and electric power smaller than the electric power supplied in the quick charging mode may be supplied from battery 402 or a battery different from battery 402 in the normal charging mode.

Electric power may be supplied from commercial power source 500 in the normal charging mode, and electric power greater than the electric power supplied in the normal charging mode may be supplied from commercial power source 500 in the quick charging mode by, for example, boosting a voltage supplied from commercial power source 500. Electric power greater than the electric power supplied in the normal charging mode may be supplied from an AC power source different from commercial power source 500 in the quick charging mode.

Electric power smaller than electric power supplied in the quick charging mode may be supplied in the normal charging mode by, for example, bucking a voltage supplied from commercial power source 500.

In the present embodiment, charging stand 200 corresponding to a power supply system supplying electric power to battery 110 of vehicle 100 includes a first supply device 210, a second supply device 220, and a control computer 230.

First supply device 210 includes a charging cable 212, a charging connector 214, and a relay 216. Charging cable 212 has one end connected to relay 216, and the other end provided with charging connector 214. Charging cable 212 may be separable from charging stand 200. In addition, charging stand 200 and vehicle 100 may also be connected using a charging cable connected to vehicle 100.

In a state where charging connector 214 is connected to vehicle 100 and relay 216 is closed, first supply device 210 supplies electric power from commercial power source 500 to the vehicle in the normal charging mode. First supply device 210 is electrically connected to a power distribution board 302 of house 300. Power distribution board 302 is connected to commercial power source 500.

As with first supply device 210, second supply device 220 includes a charging cable 222, a charging connector 224, and a relay 226. Charging cable 222 has one end connected to relay 226, and the other end provided with charging connector 224. Charging cable 222 may be separable from charging stand 200. In addition, charging stand 200 and vehicle 100 may also be connected using a charging cable connected to vehicle 100.

In a state where charging connector 224 is connected to vehicle 100 and relay 226 is closed, second supply device 220 supplies electric power from battery 402 of HEMS 400 to the vehicle in the quick charging mode. As described above, the electric power supplied from battery 402 of HEMS 400 to vehicle 100 in the quick charging mode is greater than the electric power supplied from commercial power source 500 to vehicle 100 in the normal charging mode. Accordingly, second supply device 220 supplies electric power greater than the electric power supplied by first supply device 210, from battery 402 of HEMS 400 to vehicle 100.

Control computer 230 is composed of, as an example, a CPU (Central Processing Unit) and the like. Control computer 230 is configured to be communicable with an ECU (Electronic Control Unit) 160 of vehicle 100 described later via a communication device 232 in a wireless or wired manner.

Control computer 230 indicates one of the normal charging mode and the quick charging mode to a user. More specifically, control computer 230 indicates one of first supply device 210 and second supply device 220 to the user in accordance with the state of battery 402 of HEMS 400. The state of battery 402 is monitored by a computer 406 of HEMS 400. As an example, the temperature, current, voltage, remaining capacity (SOC: State Of Charge), degradation degree, and the like of battery 402 are monitored. Information indicating the state of battery 402 is transmitted from computer 406 of HEMS 400 to control computer 230 of charging stand 200 through wireless or wired communication.

As an example, when battery 402 has a remaining capacity greater than or equal to a first predetermined value, second supply device 220 is indicated to the user, and thereby the quick charging mode is indirectly indicated to the user. More specifically, when battery 110 of vehicle 100 has a remaining capacity smaller than a second predetermined value, and battery 402 has a remaining capacity greater than or equal to the first predetermined value, second supply device 220 is indicated to the user. The remaining capacity of battery 110 of vehicle 100 is transmitted from ECU 160 of vehicle 100.

Second supply device 220 is indicated to the user by, for example, illuminating or blinking a lamp 228 provided to charging connector 224 of second supply device 220. In a case where second supply device 220 and vehicle 100 can be connected using a charging cable which is detachable from charging stand 200, a lamp provided in the vicinity of a socket or an outlet for connecting the charging cable to second supply device 220 may be illuminated or blinked.

On the other hand, when battery 402 has a remaining capacity smaller than the first predetermined value, first supply device 210 is indicated to the user, and thereby the normal charging mode is indirectly indicated to the user. First supply device 210 is indicated to the user by, for example, illuminating or blinking a lamp 218 provided to charging connector 214 of first supply device 210. In a case where first supply device 210 and vehicle 100 can be connected using a charging cable which is detachable from charging stand 200, a lamp provided in the vicinity of a socket or an outlet for connecting the charging cable to first supply device 210 may be illuminated or blinked.

In addition, first supply device 210 or second supply device 220 may be indicated by showing a character, an icon, or the like on a display or the like, or may be indicated audibly. These indication manners are merely examples, and various methods can be utilized for the indication manner.

Instead of indirectly indicating the normal charging mode or the quick charging mode by indicating first supply device 210 or second supply device 220, the normal charging mode or the quick charging mode may be directly indicated.

In the case where electric power is supplied from commercial power source 500 or the AC power source different from commercial power source 500 in the quick charging mode, for example, when an input terminal of relay 226 of second supply device 220 has a voltage greater than or equal to a threshold value, second supply device 220, that is, the quick charging mode, may be indicated to the user, and when relay 226 has a voltage lower than the threshold value, first supply device 210, that is, the normal charging mode, may be indicated to the user.

HEMS 400 includes a bidirectional PCS (Power Conditioning System) 410, DC/DC converters 412, 414, battery 402, and computer 406. Bidirectional PCS 410 converts a DC into an AC, and converts an AC into a DC. Electric power is supplied from battery 402 to second supply device 220 via bidirectional PCS 410 and DC/DC converter 412.

DC/DC converter 414 is connected to a solar battery panel 416. Electric power generated by solar battery panel 416 is supplied to battery 402 via DC/DC converter 414 and bidirectional PCS 410.

Battery 402 is, for example, a lithium ion battery, a nickel hydride battery, a lead storage battery, or the like. Instead of battery 402, a capacitor may be used. Battery 402 has a voltage of, for example, about 600 V. On the other hand, commercial power source 500 has a voltage of about 100 V or 200V in Japan, as is well known.

In addition to the electric power generated by solar battery panel 416, the electric power from commercial power source 500 can be supplied to battery 402. As an example, the electric power from commercial power source 500 is supplied to battery 402 in the nighttime during which the electricity charge is less expensive than that in the daytime. When the electric power from commercial power source 500 is supplied to battery 402, an AC is converted into a DC by bidirectional PCS 410.

In the present embodiment, computer 406 of HEMS 400 is configured to be communicable with the ECU of vehicle 100 via a communication device 408 in a wireless or wired manner. As described above, computer 406 of HEMS 400 monitors the state of battery 402. The information indicating the state of battery 402 is transmitted from computer 406 of HEMS 400 to ECU 160 of vehicle 100 through wireless or wired communication.

Figure 2:
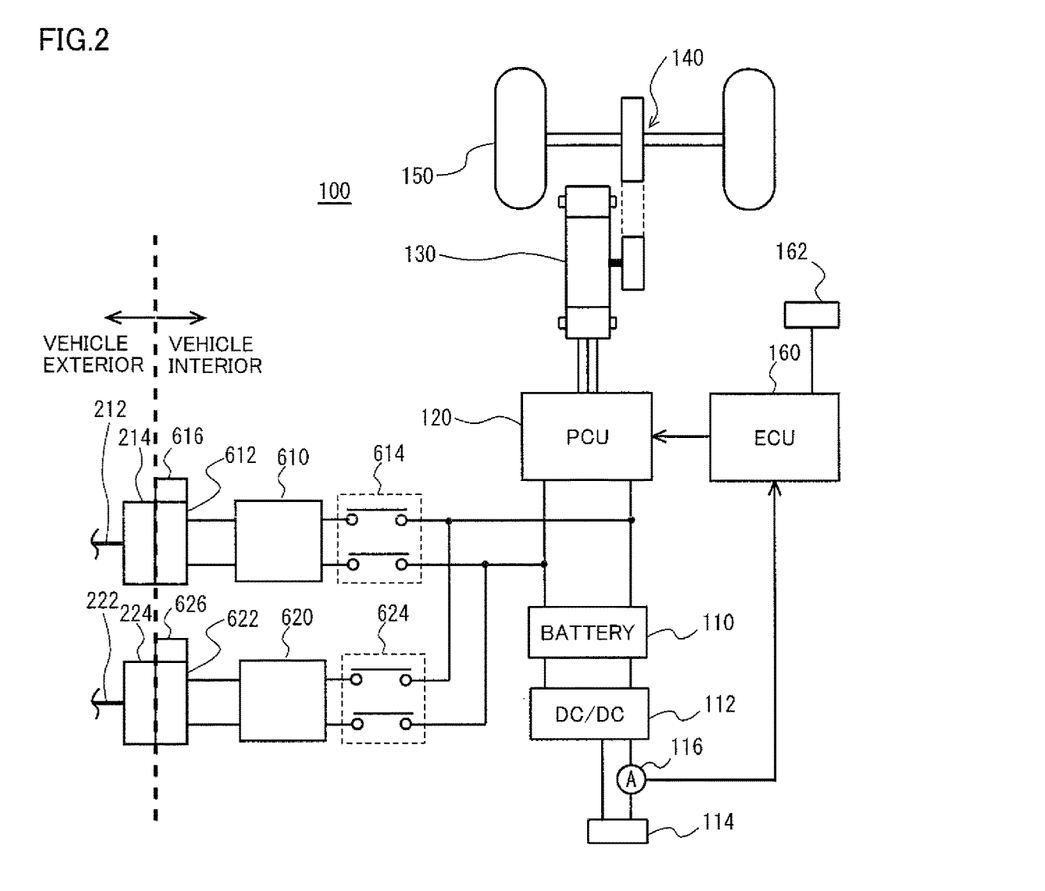
FIG. 2 is an overall schematic diagram of the vehicle.

Referring to FIG. 2, vehicle 100 will be described. Vehicle 100 includes battery 110, a PCU (Power Control Unit) 120, a motor generator 130, a reducer 140, drive wheels 150, and ECU 160.

Battery 110 is, for example, a lithium ion battery, a nickel hydride battery, a lead storage battery, or the like. Instead of battery 110, a capacitor may be used.

Battery 110 is connected to PCU 120. Battery 110 supplies PCU 120 with electric power for generating a drive force for vehicle 100. Further, battery 110 stores electric power generated by motor generator 130. Battery 110 has a voltage of, for example, about 200V.

Although not shown, PCU 120 includes a converter for boosting a power supply voltage from battery 110, an inverter for converting DC power boosted by the converter into AC power for driving motor generator 130, and the like. The converter and the inverter are each controlled by a control signal from ECU 160.

Motor generator 130 is an AC rotating electric machine, and for example a permanent magnet type synchronous electric motor provided with a rotor having a permanent magnet embedded therein.

An output torque of motor generator 130 is transmitted to drive wheels 150 via reducer 140. During regenerative braking of vehicle 100, motor generator 130 can generate electric power by a rotational force of drive wheels 150. Then, the generated electric power is converted by PCU 120 into charging power for battery 110.

It is noted that, although FIG. 1 shows a configuration in which one motor generator is provided, the number of the motor generator is not limited thereto, and a configuration in which a plurality of motor generators are provided may be adopted.

Further, in a hybrid vehicle equipped with an engine in addition to motor generator 130, a required vehicle drive force is generated by operating the engine and motor generator 130 in a coordinated manner. In this case, battery 110 can also be charged using electric power generated by the rotation of the engine.

Namely, vehicle 100 in the present embodiment represents a vehicle equipped with an electric motor for generating a vehicle drive force, and includes a hybrid vehicle generating a vehicle drive force by an engine and an electric motor, or an electric vehicle, a fuel cell vehicle, and the like having no engine.

ECU 160 includes a CPU, a storage device, and an input/output buffer. ECU 160 receives a signal from each sensor or the like and outputs a control signal to each apparatus, and controls vehicle 100 and each apparatus. It is noted that these controls can be processed not only by software but also by exclusive hardware (electronic circuit).

In the present embodiment, ECU 160 is configured to be communicable with control computer 230 of charging stand 200 and computer 406 of HEMS 400 via a communication device 162 in a wireless or wired manner.

ECU 160 generates and outputs the control signals for controlling PCU 120 and the like. It is noted that, although FIG. 1 shows a configuration in which ECU 160 is provided as one control device, a configuration in which, for example, an individual control device is provided for each function or for each apparatus to be controlled, such as a control device for PCU 120, a control device for battery 110, and the like, may be adopted.

In the present embodiment, vehicle 100 is provided with a DC/DC converter 112 and an outlet 114 for drawing electric power from battery 110. A current drawn from battery 110 via outlet 114 is detected by a current sensor 116, and a signal indicating a detection result is transmitted to ECU 160. By current sensor 116 detecting a current of greater than or equal to a predetermined current value, ECU 160 detects that a power cord of an electronic apparatus is connected to outlet 114.

Vehicle 100 further includes a first charging device 610 and a second charging device 620. First charging device 610 is a device for charging battery 110 by the electric power from commercial power source 500. First charging device 610 is connected to a first inlet 612. First inlet 612 is provided to an outer surface of vehicle 100.

To first inlet 612, charging connector 214 of charging cable 212 is connected. Accordingly, first inlet 612 is connected to commercial power source 500 via charging cable 212.

First charging device 610 is connected to battery 110 via a relay 614. Relay 614 is controlled by a control signal from ECU 160. Relay 614 is closed when normal charging using first charging device 610 is performed, and is opened when charging using first charging device 610 is not performed.

First charging device 610 converts the AC supplied from commercial power source 500 into a DC and boosts or bucks a voltage to a desired voltage, for supply to battery 110.

Second charging device 620 charges battery 110 by the electric power from battery 402 of HEMS 400. Accordingly, second charging device 620 charges battery 110 using electric power greater than the electric power used by first charging device 610 to charge battery 110. Second charging device 620 is connected to a second inlet 622. Second inlet 622 is provided to the outer surface of vehicle 100. Second charging device 620 may not be provided.

To second inlet 622, charging connector 224 of charging cable 222 is connected. Accordingly, second inlet 622 is connected to battery 402 of HEMS 400, which supplies electric power greater than the electric power supplied by commercial power source 500, via charging cable 222.

Second charging device 620 is connected to battery 110 via a relay 624. Relay 624 is controlled by a control signal from ECU 160. Relay 624 is closed when quick charging using second charging device 620 is performed, and is opened when charging using second charging device 620 is not performed.

Second charging device 620 boosts or bucks a voltage to a desired voltage, and supplies the electric power from battery 402 of HEMS 400 to battery 110 of vehicle 100.

In the present embodiment, ECU 160 indicates one of first inlet 612 and second inlet 622 to the user in accordance with the state of battery 110 of vehicle 100. The state of battery 110 is monitored by ECU 160. As an example, the temperature, current, voltage, remaining capacity, degradation degree, and the like of battery 110 are monitored.

As an example, when battery 110 has a remaining capacity smaller than the second predetermined value, second inlet 622 is indicated to the user, and thereby the quick charging mode is indirectly indicated to the user. More specifically, when battery 110 of vehicle 100 has a remaining capacity smaller than the second predetermined value, and battery 402 of HEMS 400 has a remaining capacity greater than or equal to the first predetermined value, second inlet 622 is indicated to the user. The remaining capacity of battery 402 of HEMS 400 is transmitted from computer 406 of HEMS 400. As an example, the second predetermined value is a value close to the remaining capacity in a fully charged state. However, it is not limited thereto.

ECU 160 indicates second inlet 622 to the user by, for example, illuminating or blinking a lamp 626 provided to second inlet 622. In a case where a cord which is taken up by a reel within vehicle 100 and accommodated therein is connected to battery 402 of HEMS 400 via charging stand 200 without providing second inlet 622, a lamp provided in the vicinity of a pull-out port for the cord or to a plug at a leading end of the cord may be illuminated or blinked.

On the other hand, when battery 110 has a remaining capacity greater than or equal to the second predetermined value, first inlet 612 is indicated to the user, and thereby the normal charging mode is indirectly indicated to the user. ECU 160 indicates first inlet 612 to the user by, for example, illuminating or blinking a lamp 616 provided to first inlet 612. In a case where a cord which is taken up by a reel within vehicle 100 and accommodated therein is connected to commercial power source 500 via charging stand 200 without providing first inlet 612, a lamp provided in the vicinity of a pull-out port for the cord or to a plug at a leading end of the cord may be illuminated or blinked.

When battery 110 has a temperature higher than a predetermined temperature, first inlet 612 may be indicated to the user. Further, when battery 110 has a degradation degree greater than a predetermined degree, first inlet 612 may be indicated to the user. The degradation degree of battery 110 is calculated, for example, from accumulated values of charging power and discharging power of battery 110, in accordance with a map. The method for calculating the degradation degree is not limited thereto. Further, when a power cord of an electronic apparatus is connected to outlet 114 for drawing electric power from battery 110, first inlet 612 may be indicated to the user.

In addition, first inlet 612 or second inlet 622 may be indicated by showing a character, an icon, or the like on a display or the like, or may be indicated audibly. These indication manners are merely examples, and various methods can be utilized for the indication manner.

Instead of indirectly indicating the normal charging mode or the quick charging mode by indicating first inlet 612 or second inlet 622, the normal charging mode or the quick charging mode may be directly indicated.

Figure 3:
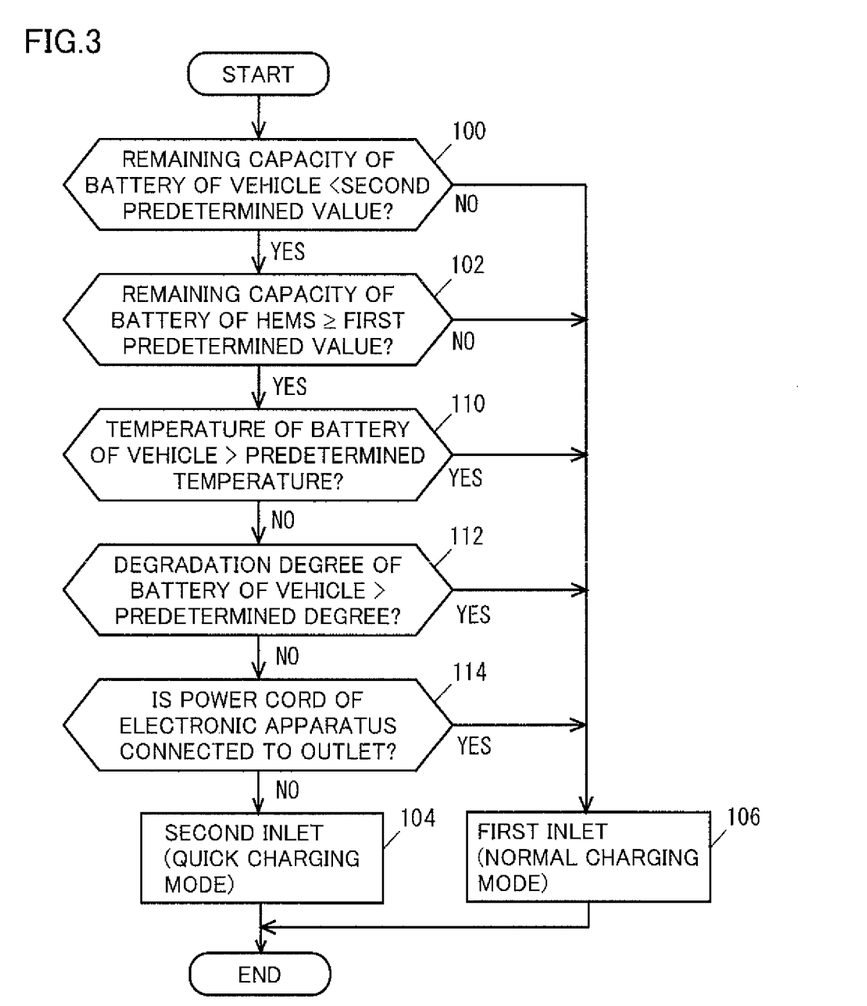
FIG. 3 is a flowchart illustrating processing performed by a control computer of a charging stand.

Referring to FIG. 3, processing performed by control computer 230 of charging stand 200 in the present embodiment will be described. The processing described below may be implemented by software, may be implemented by hardware, or may be implemented by cooperation of software and hardware.

In step (hereinafter abbreviated as S) 100, it is determined whether or not the remaining capacity of battery 110 of vehicle 100 is smaller than the second predetermined value. When the remaining capacity of battery 110 of vehicle 100 is smaller than the second predetermined value (YES in S100), it is determined in S102 whether or not the remaining capacity of battery 402 of HEMS 400 is greater than or equal to the first predetermined value. When the remaining capacity of battery 402 of HEMS 400 is greater than or equal to the first predetermined value (YES in S102), basically, second supply device 220 is indicated to the user in S104. Thereby, using second supply device 220 to charge battery 110 of vehicle 100 is indicated to the user. Thus, the user is urged to perform charging in the quick charging mode in which the electric power supplied from battery 402 of HEMS 400 is used.

On the other hand, when the remaining capacity of battery 110 of vehicle 100 is greater than or equal to the second predetermined value (NO in S100), first supply device 210 is indicated to the user in S106. Similarly, when the remaining capacity of battery 402 of HEMS 400 is smaller than the first predetermined value (NO in S102), first supply device 210 is indicated to the user in S106. Thereby, using first supply device 210 to charge battery 110 of vehicle 100 is indicated to the user. Thus, the user is urged to perform charging in the normal charging mode in which the electric power supplied from commercial power source 500 is used.

First supply device 210 is also indicated to the user (S106) when the temperature of battery 110 of vehicle 100 is higher than a predetermined temperature value (YES in S110), when the degradation degree of battery 110 of vehicle 100 is greater than a predetermined degree (YES in S112), or when a power cord of an electronic apparatus is connected to outlet 114 of vehicle 100 (YES in S114).

Figure 4:
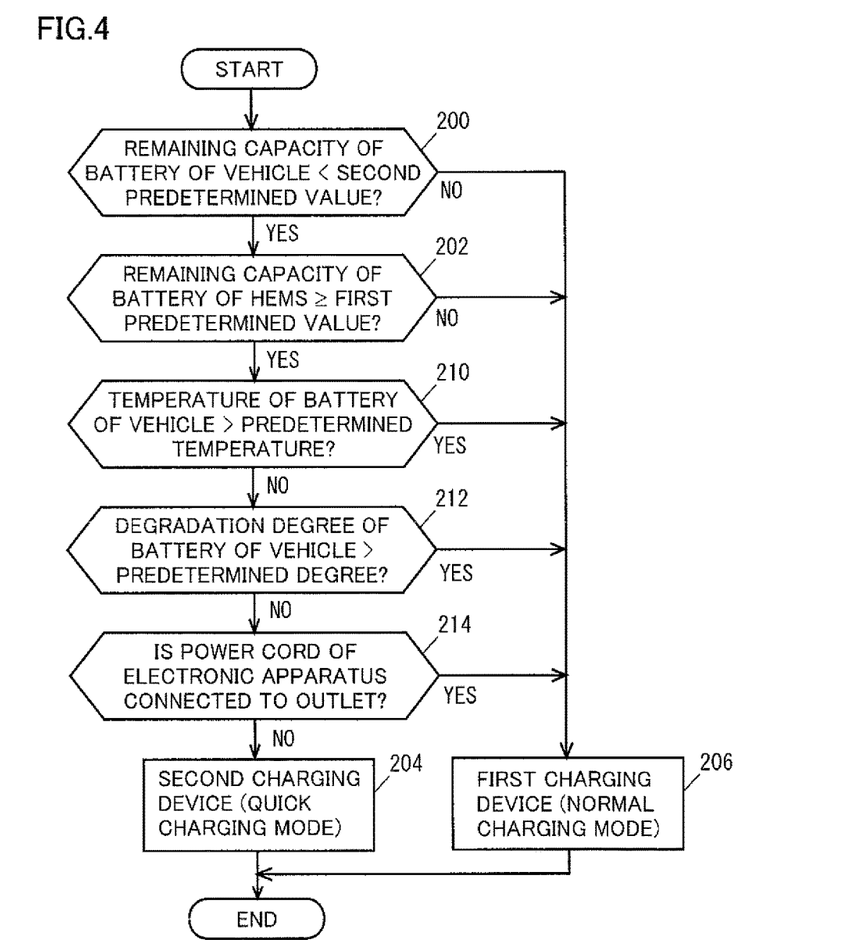
FIG. 4 is a flowchart illustrating processing performed by an ECU of the vehicle.

Referring to FIG. 4, processing performed by ECU 160 in the present embodiment will be described. The processing described below may be implemented by software, may be implemented by hardware, or may be implemented by cooperation of software and hardware.

In S200, it is determined whether or not the remaining capacity of battery 110 mounted in vehicle 100 is smaller than the second predetermined value. When the remaining capacity of battery 110 is smaller than the second predetermined value (YES in S200), it is determined in S202 whether or not the remaining capacity of battery 402 of HEMS 400 is greater than or equal to the first predetermined value. When the remaining capacity of battery 402 of HEMS 400 is greater than or equal to the first predetermined value (YES in S202), basically, second inlet 622 is indicated to the user in S204. Thereby, using second inlet 622 to charge battery 110 of vehicle 100 is indicated to the user. Thus, the user is urged to perform charging in the quick charging mode in which the electric power supplied from battery 402 of HEMS 400 is used.

On the other hand, when the remaining capacity of battery 110 is greater than or equal to the second predetermined value (NO in S200), first inlet 612 is indicated to the user in S206. Similarly, when the remaining capacity of battery 402 of HEMS 400 is smaller than the first predetermined value (NO in S202), first inlet 612 is indicated to the user in S206.

First inlet 612 is also indicated to the user (S206) when the temperature of battery 110 of vehicle 100 is higher than a predetermined temperature value (YES in S210), when the degradation degree of battery 110 of vehicle 100 is greater than a predetermined degree (YES in S212), or when a power cord of an electronic apparatus is connected to outlet 114 of vehicle 100 (YES in S214). Thereby, using first inlet 612 to charge battery 110 of vehicle 100 is indicated to the user. Thus, the user is urged to perform charging in the normal charging mode in which the electric power supplied from commercial power source 500 is used.

Figure 5:
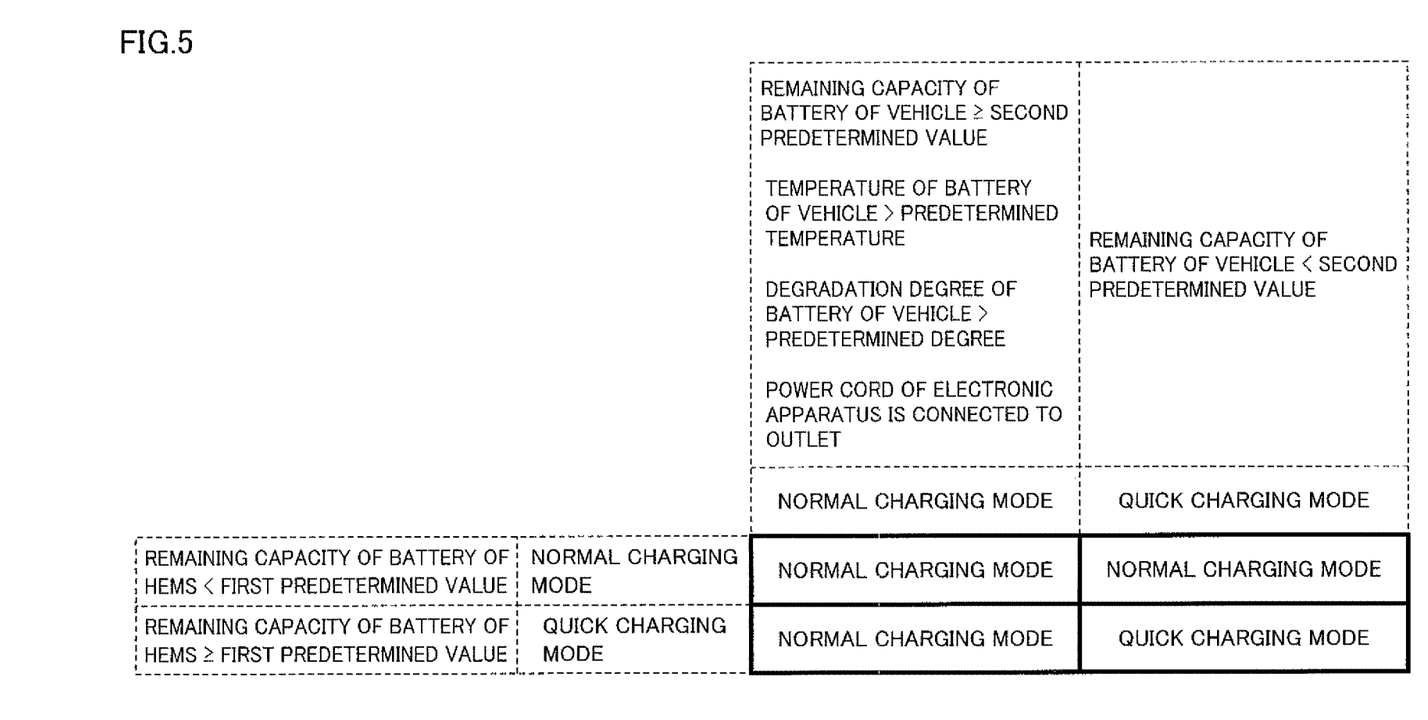
FIG. 5 is a view showing charging modes indicated to a user.

FIG. 5 shows charging modes indicated in accordance with the state of battery 402 of HEMS 400, charging modes indicated in accordance with the state of battery 110 of vehicle 100, and charging modes ultimately indicated to the user, under various conditions. As is clear from FIG. 5, the quick charging mode is ultimately indicated to the user only when the charging mode indicated in accordance with the state of battery 402 of HEMS 400 is the quick charging mode and the charging mode indicated in accordance with the state of battery 110 of vehicle 100 is the quick charging mode.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

100: vehicle; 110: battery; 112: DC/DC converter; 114: outlet; 116: current sensor; 130: motor generator; 140: reducer; 150: drive wheel; 160: ECU; 162: communication device; 200: charging stand; 210: first supply device; 212: charging cable; 214: charging connector; 216: relay; 218: lamp; 220: second supply device; 222: charging cable; 224: charging connector; 226: relay; 228: lamp; 230: control computer; 232: communication device; 300: house; 302: power distribution board; 400: HEMS; 402: battery; 406: computer; 408: communication device; 410: PCS; 412, 414: DC/DC converter; 416: solar battery panel; 500: commercial power source; 610: first charging device; 612: first inlet; 614: relay; 616: lamp; 620: second charging device; 622: second inlet; 624: relay; 626: lamp.

The invention claimed is:

1. A charging system for a vehicle equipped with a power storage device and provided with an outlet drawing electric power from said power storage device and supplying the electric power drawn from said power storage device to an electronic apparatus outside the vehicle, a power cord of the electronic apparatus being detachable from the outlet, the power storage device being mounted on the vehicle, the system comprising:
a charging device configured to charge said power storage device in one of a first charging mode and a second charging mode such that electric power supplied in said second charging mode is greater than electric power supplied in said first charging mode; and
an indicating device configured to indicate a selection of said first charging mode to a user when the power cord of the electronic apparatus outside the vehicle is connected to said outlet.

2. The charging system for the vehicle according to claim 1, wherein:
in said first charging mode, said charging device is configured to charge said power storage device by electric power supplied from a first power source, and
in said second charging mode, said charging device is configured to charge said power storage device by electric power supplied from a second power source that is different from said first power source.

3. The charging system for the vehicle according to claim 2, further comprising:
a first connection portion to be connected to said first power source; and
a second connection portion to be connected to said second power source,
wherein, when the power cord of said electronic apparatus is connected to said outlet, said indicating device indicates said first connection portion to the user.

4. The charging system for the vehicle according to claim 2, wherein:
said first power source is a commercial power source, and
said second power source is a power storage device arranged outside said vehicle.

5. The charging system for the vehicle according to claim 1, wherein the indicating device indicating the selection of the first charging mode to the user when the power cord is connected to the outlet includes where the indicating device instructs the user to use the first charging mode instead of the second charging mode.

6. A method for charging a vehicle equipped with a power storage device and provided with an outlet drawing electric power from said power storage device and supplying the electric power drawn from the power storage device to an electronic apparatus outside the vehicle, a power cord of the electronic apparatus being detachable from the outlet, the power storage device being mounted on the vehicle, the method comprising the steps of:
determining a state of said power storage device; and
indicating one of a first charging mode and a second charging mode to a user such that electric power supplied in said second charging mode is greater than electric power supplied in said first charging mode and a selection of said first charging mode is indicated when the power cord of the electronic apparatus outside the vehicle is connected to said outlet.

7. The method according to claim 6, wherein indicating the selection of the first charging mode to the user when the power cord is connected to the outlet includes instructing the user to use the first charging mode instead of the second charging mode.

* * * * *